(12) United States Patent  (10) Patent No.: US 7,996,524 B2
Aoki et al.  (45) Date of Patent: Aug. 9, 2011

(54) CONTROLLING EXTERNAL COMMUNICATION OF EMBEDDED DEVICE USING PROXY SERVER

(75) Inventors: Yasuhiro Aoki, Kanagawa-ken (JP); Munetaka Ohtani, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 12/296,791

(22) PCT Filed: Apr. 10, 2007

(86) PCT No.: PCT/JP2007/057895
§ 371 (c)(1),
(2), (4) Date: Oct. 10, 2008

(87) PCT Pub. No.: WO2007/123025
PCT Pub. Date: Nov. 1, 2007

(65) Prior Publication Data
US 2009/0201944 A1    Aug. 13, 2009

(30) Foreign Application Priority Data

Apr. 13, 2006  (JP) ................... 2006-111300

(51) Int. Cl.
*G06F 15/16* (2006.01)
*G06F 15/173* (2006.01)
(52) U.S. Cl. ......... 709/224; 709/203; 709/227; 709/229
(58) Field of Classification Search ................ 709/203, 709/224, 227; 719/313; 726/11
See application file for complete search history.

(56) References Cited

U.S. PATENT DOCUMENTS

| 6,400,729 | B1 | 6/2002 | Shimadoi et al. |
| 2002/0004834 | A1 | 1/2002 | Guenther et al. |
| 2004/0255048 | A1 | 12/2004 | Lev Ran et al. |
| 2006/0009213 | A1 | 1/2006 | Sturniolo et al. |
| 2006/0031524 | A1* | 2/2006 | Freimuth et al. ............. 709/227 |
| 2006/0053485 | A1* | 3/2006 | Li .................................. 726/11 |

(Continued)

FOREIGN PATENT DOCUMENTS

EP    1 170 923 A1    1/2002

(Continued)

OTHER PUBLICATIONS

Hiroaki Takada, TCP/IP API for Embedded Systems, Information Processing Society of Japan Symposium Series, vol. 98, No. 15, Nov. 19, 1998, pp. 25-32.

(Continued)

*Primary Examiner* — Quang N. Nguyen
(74) *Attorney, Agent, or Firm* — Stephen R. Tkacs; Stephen J. Walder, Jr.; Jill Poimboeuf

(57) ABSTRACT

An embedded device communicates with another device via an external proxy server acting for the embedded device to control communication. The embedded device includes a communication device capable of communicating with the proxy server, a storage unit storing a state of communication with the other device, an updating unit, a response unit responding to the task with a result of the updating of the communication state that has been performed in accordance with the control request, and a control instruction unit transmitting, to the proxy server by means of the communication device, an instruction for changing a state of communication with the other device in the proxy server to the communication state stored in the storage.

20 Claims, 10 Drawing Sheets

U.S. PATENT DOCUMENTS

2007/0277179 A1* 11/2007 Suzuka .................. 719/313

FOREIGN PATENT DOCUMENTS

| JP | 09-022391 | 1/1997 |
| JP | 11-225376 | 8/1999 |
| JP | 11-275170 | 10/1999 |
| JP | 2002-063088 | 2/2002 |
| JP | 2003-46599 | 2/2003 |
| JP | 2004-260362 | 9/2004 |

OTHER PUBLICATIONS

Extended European Search Report including the Supplementary European Search Report and the European Search Opinion dated Aug. 24, 2010 for Application No. 07741331.8-2413/2015190 PCT/JP2007057895, 11 pages.

* cited by examiner

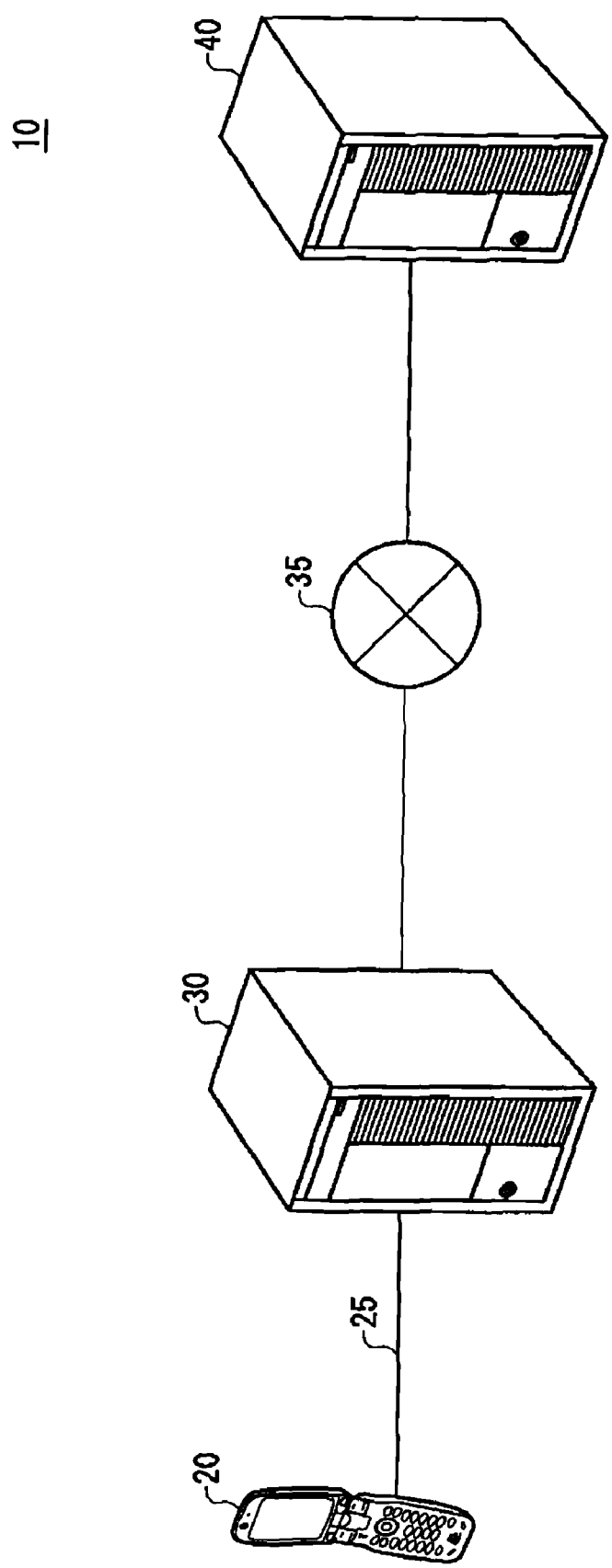

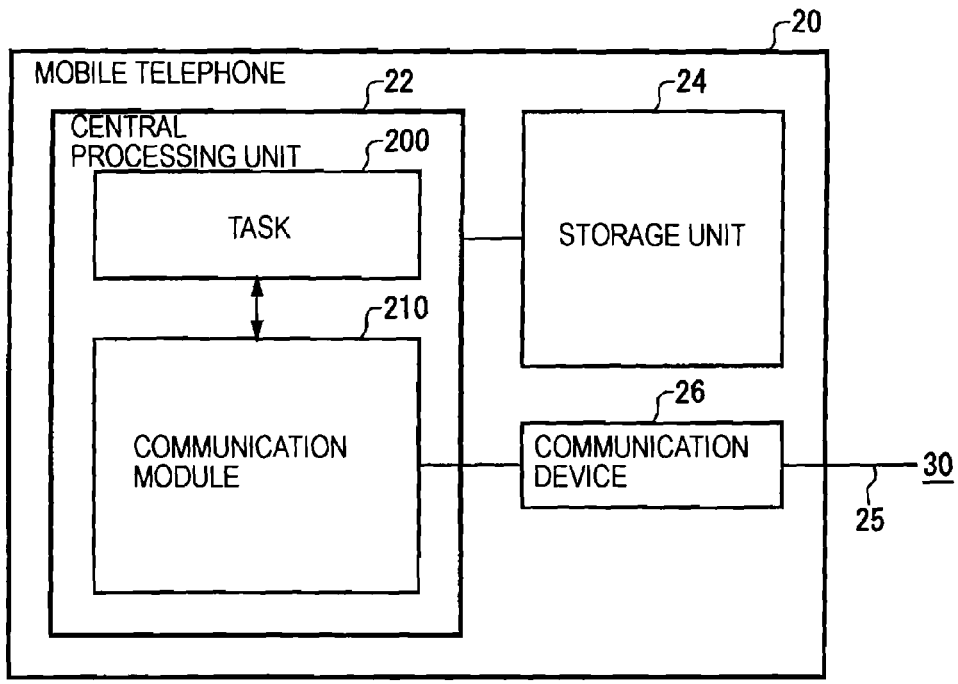

FIG. 6

| COMMUNICATION STATE | INSTRUCTION FOR PROXY SERVER |
|---|---|
| OPEN | socket |
| LISTEN | socket, bind, listen |
| ACCEPT | socket, bind, listen, accept |
| SELECT | socket, select |
| RECV | socket, recv |
| SEND | socket, send |
| LISTEN+SELECT | socket, bind, listen, select |

CONTROLLING EXTERNAL COMMUNICATION OF EMBEDDED DEVICE USING PROXY SERVER

TECHNICAL FIELD

The present invention relates to an embedded device, a proxy server, a method, and a program, and, more particularly, to an embedded device, a proxy server, a method, and a program in which the proxy server acts for the embedded device to control communication.

BACKGROUND

Currently, more sophisticated software is required. In addition, with the proliferation of embedded devices such as mobile telephones and digital household appliances, software is sometimes required to operate on many different platforms. In order to effectively develop such software, Model Driven Development (MDD) has been studied. According to MDD, software capable of operating on various platforms can be automatically generated on the basis of software specifications written using Unified Modeling Language (UML).

An example of a technique enabling MDD is Rational Rose (R) RT developed by International Business Machines Corporation. A developer creates or corrects software specifications on a generic personal computer using this technique. Software generated on the basis of the created or corrected software specifications is transmitted to an embedded device via a communication line, and is then executed. In addition, in this technique, a debugging environment for comparing software with software specifications is provided. For example, a developer can check on the display screen of a personal computer which part of the software specifications is being executed by an embedded device.

However, in order to conduct such development, an embedded device is required to have communications capability. In order to have communications capability, for example, a communication device capable of performing communication in accordance with Ethernet (registered trademark) and a device driver for controlling the communication device are required. In addition, in some cases, development software requires control software for TCP/IP that is a generic communication protocol. However, some embedded devices do not have TCP/IP communications capability. In this case, a device driver, which will not be employed in an end product, has to be specially developed. This may lead to an increase in development cost and a longer development period.

According to past techniques, TCP/IP-based communication can be converted into another protocol-based communication. Consequently, TCP/IP-based communication can be performed via a communication line such as a serial interface without using Ethernet. If this technique is applied to an embedded device, an Ethernet communication device is not required. However, control software for TCP/IP is still required. This control software may increase the required memory capacity of the embedded device.

According to other past attempts, communication of a first device can be performed by a second device in place of the first device. The first device calls a communication procedure on the second device using Remote Procedure Call (RPC) protocol, whereby this communication is achieved. However, RPC cannot be used when TCP/IP communication is not established. That is, in this technique, control software for TCP/IP is also required. This control software may increase the required memory capacity of the embedded device. In addition, if the condition of a communication line is poor, communication may be stopped and may not be restored.

SUMMARY

In one illustrative embodiment, an embedded device communicates with another device via an external proxy server acting for the embedded device to control communication. The embedded device comprises a central processing unit, a communication device configured to communicate with the external proxy server, a storage unit storing a state of communication with the other device, and an updating unit updating, in response to a control request for communication with the other device being received from a task being executed by the central processing unit, the state of communication responsive to the communication device being unable to communicate with the proxy server. The embedded device further comprises a response unit responding to the task with a result of the updating of the state of communication and a control instruction unit transmitting, to the proxy server via the communication device, an instruction for changing a state of communication with the other device in the proxy server to the state of communication stored in the storage unit responsive to the communication device being able to communicate with the proxy server.

In another illustrative embodiment, a computer program product comprises a computer recordable medium having a control program recorded thereon. The control program controls an embedded device which communicates with another device via an external proxy server acting for the embedded device to control communication. The control program, when executed on the embedded device, causes the embedded device to communicate with the proxy server, store a state of communication with the other device in a storage unit of the embedded device, and update, in response to a control request for communication with the other device being received from a task being executed by a central processing unit of the embedded device, the state of communication responsive to the communication device being unable to communicate with the proxy server. The control program further causes the embedded device to respond to the task with a result of the updating of the state of communication and transmit to the proxy server an instruction for changing a state of communication with the other device in the proxy server to the state of communication stored in the storage unit responsive to the communication device being able to communicate with the proxy server.

In another illustrative embodiment, a method is provided for controlling an embedded device which communicates with another device via an external proxy server acting for the embedded device to control communication. The method comprises storing a state of communication with the other device in a storage unit of the embedded device, and updating, in response to a control request for communication with the other device being received from a task being executed by a central processing unit of the embedded device, the state of communication responsive to the embedded device being unable to communicate with the proxy server. The method further comprises responding to the task with a result of the updating of the state of communication and transmitting to the proxy server an instruction for changing a state of communication with the other device in the proxy server to the state of communication stored in the storage unit responsive to the embedded device being able to communicate with the proxy server.

These and other features of the illustrative embodiments will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 shows the entire configuration of a communication system in accordance with an illustrative embodiment;

FIG. 2 shows a functional configuration of a mobile telephone in accordance with an illustrative embodiment;

FIG. 3 shows an example data structure of a storage unit in accordance with an illustrative embodiment;

FIG. 6 shows communication states of the mobile telephone and instructions that are transmitted to the communication device in accordance with the communication states in accordance with an illustrative embodiment;

DETAILED DESCRIPTION

Figure 4:
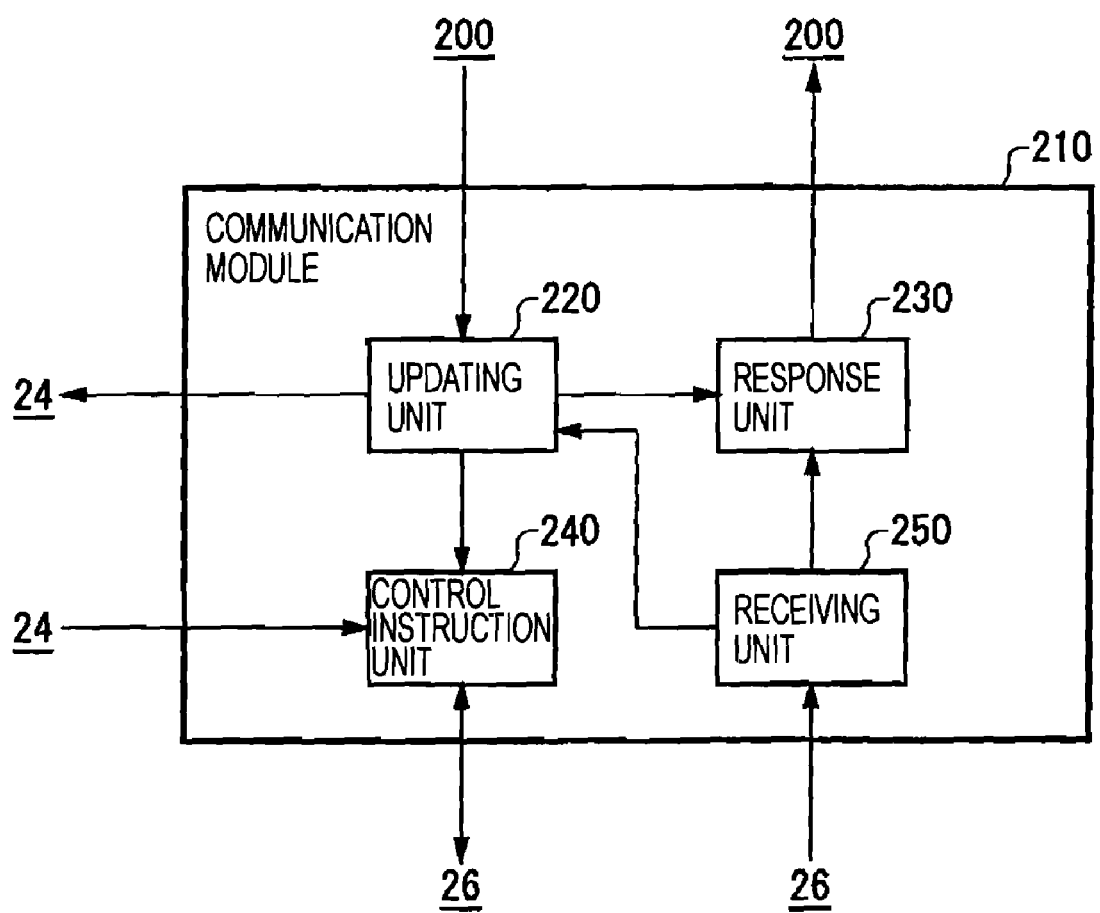
FIG. 4 shows a functional configuration of a communication module in accordance with an illustrative embodiment.

According to the illustrative embodiments as described herein, there is provided an embedded device communicating with another device via an external proxy server acting for the embedded device to control communication, which includes a communication device capable of communicating with the proxy server, a storage unit storing a state of communication with the other device, an updating unit updating, in response to a control request for communication with the other device received from a task being executed by a central processing unit, the state of communication to a state indicated after control processing according to the control request has been normally performed, in a situation where the communication device cannot communicate with the proxy server, a response unit responding to the task with a result of the updating of the communication state that has been performed in accordance with the control request, and a control instruction unit transmitting, to the proxy server by means of the communication device, an instruction for changing a state of communication with the other device in the proxy server to the communication state stored in the storage, in a situation where the communication device can communicate with the proxy server.

According to the illustrative embodiments, communication of an embedded device can be more effectively achieved.

The present invention will be described with reference to the illustrative embodiments. However, the claimed invention is not limited to the following embodiments. Furthermore, all of the combinations of features described in the following embodiments are not necessarily required for solving the problems recognized herein.

FIG. 1 shows the entire configuration of a communication system 10 in accordance with an illustrative embodiment. The communication system 10 is provided with a mobile telephone 20, a proxy server 30, and a communication device 40. The mobile telephone 20 is an example of an embedded device upon which software development and debugging are performed, and is connected to the proxy server 30 via a first communication line 25 such as a serial interface. The mobile telephone 20 executes a program under development or verification, and transmits notification of its execution state to the communication device 40 so as to display the execution state on the display screen of the communication device 40. In addition, the mobile telephone 20 suspends or restarts execution of the program in accordance with an instruction received from the communication device 40. The embedded device may be a PDA, a digital household appliance, or an electronically controlled vehicle instead of the mobile telephone.

The proxy server 30 is connected to the mobile telephone 20 via the first communication line 25, and, to another device (for example, the communication device 40) via a second communication line 35 compliant with, for example, Ethernet (registered trademark). The proxy server 30 controls communication between the mobile telephone 20 and the communication device 40 on behalf of the mobile telephone 20. For example, the proxy server 30 controls TCP/IP communication between the mobile telephone 20 and the communication device 40 on behalf of the mobile telephone 20 that has no TCP/IP communication control capability. The communication device 40 executes a program for developing and debugging a program to be installed in the mobile telephone 20. The communication device 40 performs TCP/IP communication with the proxy server 30, thereby receiving from the mobile telephone 20 the execution state of the program running thereon, or causing the mobile telephone 20 to suspend or restart execution of the program.

Thus, the communication system 10 according to the embodiment of the present invention causes the proxy server 30, which is externally connected to an embedded device having no communications capability compliant with a generic communication protocol such as TCP/IP, to control communication compliant with a given communication protocol on behalf of the embedded device. Consequently, the mobile telephone 20 is not required to have a communication control program. This can reduce the required memory capacity of the mobile telephone 20 and the effort spent on developing a program to be executed in the mobile telephone 20.

FIG. 2 shows a functional configuration of the mobile telephone 20 in accordance with an illustrative embodiment. The mobile telephone 20 is provided with a central processing unit 22, a storage unit 24, and a communication device 26. The central processing unit 22 executes a program preinstalled in the mobile telephone 20. The storage unit 24 is disposed so as to achieve the execution of the program or store a state of communication with the communication device 40. The communication device 26 is connected to the proxy server 30 via the first communication line 25 so as to communicate with the proxy server 30. The first communication line 25 between the communication device 26 and the proxy server 30 may be temporarily disconnected. For example, a user may temporarily remove the first communication line 25 from the mobile telephone 20 while the mobile telephone 20 executes the program.

The central processing unit 22 functions as a task 200 and a communication module 210 by executing the program preinstalled in the mobile telephone 20. The task 200 includes API (Application Programming Interface) calls. This API is used to control TCP/IP socket communication and may meet a predetermined standard that is compatible with, for example, BSD (Berkeley Software Distribution) UNIX (registered trademark). The task 200 may be a process or thread for which an operating system periodically provides execution authority.

A library program used to make the central processing unit 22 serve as the communication module 210 is installed in the mobile telephone 20 instead of a library program used to perform socket communication. The task 200 calls an API included in the installed library program instead of an API for socket communication control, thereby transmitting a request to control communication with the communication device 40 to the communication module 210. Since the same interface can be used to call the API for socket communication and the API included in the installed library program, the library program does not have to be rewritten so as to adapt to the communication module 210.

Upon receiving the control request from the task 200, the communication module 210 transmits a control instruction corresponding to the control request to the proxy server 30 via the communication device 26. If the communication module 210 receives the control request when the first communication line 25 is disconnected, the communication module 210 performs the following processing. If the received control request is a predetermined nonblocking control request, the communication module 210 updates a communication state stored in the storage unit 24 without communicating with the proxy server 30. Subsequently, the communication module 210 transmits the update result of the communication state to the task 200. If the first communication line 25 is connected, the communication module 210 transmits to the proxy server 30 an instruction for changing a state of communication with the communication device 40 in the proxy server 30 to the communication state stored in the storage unit 24. Thus, even if the first communication line 25 is disconnected, the task 200 can continue the process thereof without waiting until the first communication line 25 is connected.

FIG. 3 shows an example data structure of the storage unit 24 in accordance with an illustrative embodiment. The storage unit 24 stores the communication state of each socket used to perform socket communication between the mobile telephone 20 and the communication device 40 in association with the identification information of each socket (for example, an identifier called as a file descriptor). The storage unit 24 may store a port number assigned to each socket, an address of a communication buffer allowing each socket to perform communication, and an identification number of a task that is being suspended until each socket completes communication.

As an example, a socket having identification information 1 is in a generation state (OPEN state) indicating that the socket has been newly generated. No port number and no buffer address are assigned to this socket. A socket having identification information 5 is in a state (RECV state) indicating that data receiving by the socket is handled. An address of a communication buffer and an identification number of a task that is being suspended until completion of the data receiving are assigned to this socket.

FIG. 4 shows a functional configuration of the communication module 210 in accordance with an illustrative embodiment. The communication module 210 is provided with an updating unit 220, a response unit 230, a control instruction unit 240, and a receiving unit 250. In response to receiving a control request to control communication with the communication device 40 from the task 200 performed by the central processing unit 22, the updating unit 220 determines whether the received control request is a nonblocking control request. The nonblocking control request indicates that the task 200 can continue to perform the process thereof without waiting until control processing corresponding to the control request is completed. For example, if the control request received from the task 200 is a request to acquire or free a required communication resource (for example, a storage area in a memory), the updating unit 220 may determine that the received control request is a nonblocking control request.

When the received control request is a nonblocking control request, the updating unit 220 updates the communication state stored in the storage unit 24 to a communication state indicated after control processing according to the control request has been normally performed, even if the communication device 26 cannot communicate with the proxy server 30. On the other hand, when the control request received from the task 200 is not a nonblocking control request, the updating unit 220 updates the communication state stored in the storage unit 24 to the result of control processing received by the receiving unit 250. For example, if the control request received from the task 200 is a request to transmit or receive data to or from the communication device 40, the updating unit 220 determines that the received control request is a blocking control request.

The response unit 230 responds to the task 200 with a result of the updating of the communication state, which has been performed in accordance with the control request. That is, for a nonblocking control request, the response unit 230 responds to the task 200 with the update result without waiting until control processing according to the control request is performed. On the other hand, for a blocking control request, when the receiving unit 250 receives the result of control processing according to the control request from the proxy server 30, the response unit 230 responds to the task 200 with the received result. When the communication device 26 can communicate with the proxy server 30, the control instruction unit 240 transmits to the proxy server 30 via the communication device 26 an instruction for changing a state of communication with the communication device 40 in the proxy server 30 to the communication state stored in the storage unit 24.

The receiving unit 250 receives from the proxy server 30 via the communication device 26 the result of control processing that has been performed by the proxy server 30 in accordance with the instruction transmitted from the control instruction unit 240. Subsequently, the receiving unit 250 transmits the received result to the updating unit 220 and the response unit 230. If a blocking control request has been received, the updating unit 220 updates the communication state stored in the storage unit 24 to the received result, and the response unit 230 responds to the task 200 with the received result.

Figure 5:
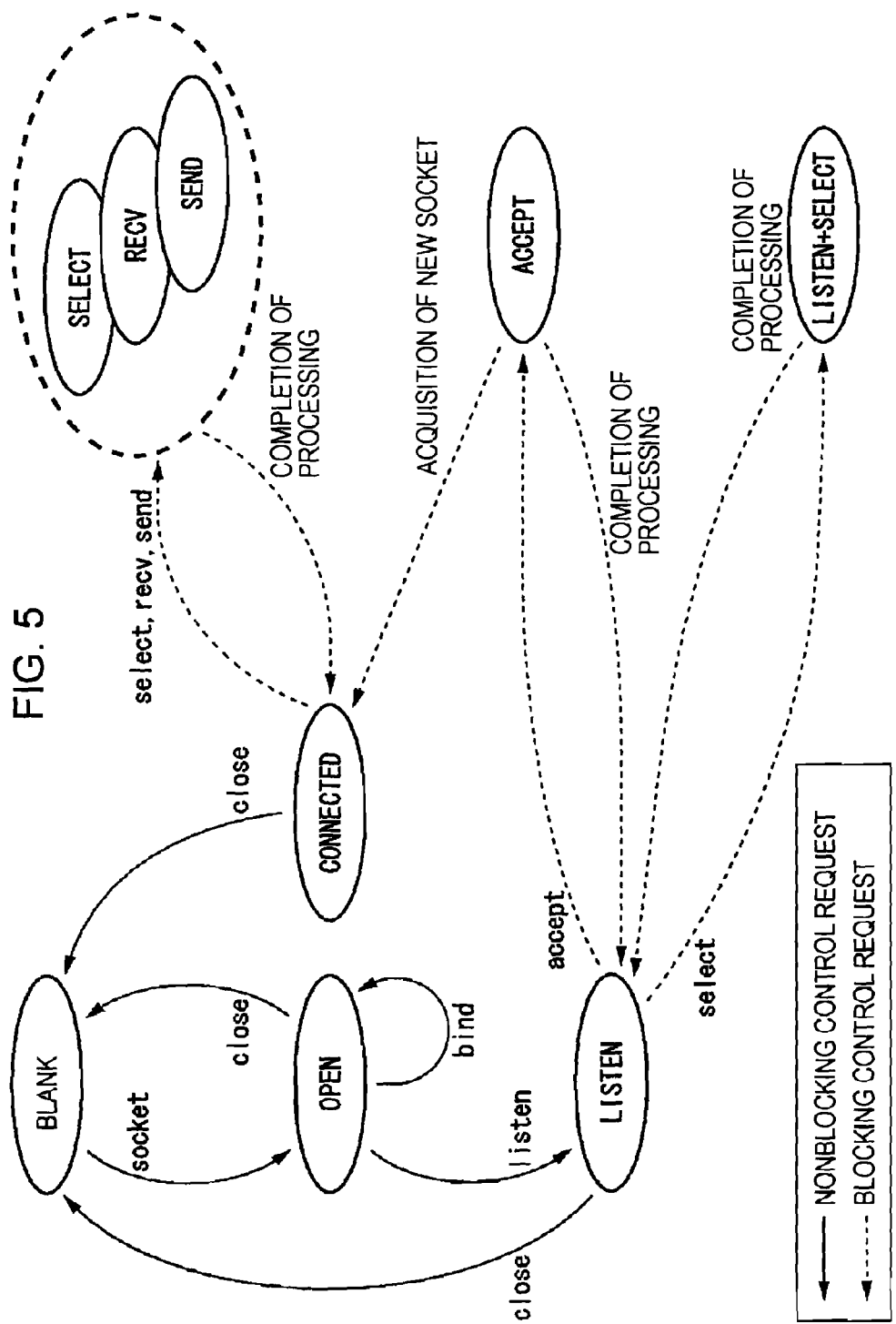
FIG. 5 shows communication state transition of communication between the mobile telephone and a communication device in accordance with an illustrative embodiment.

FIG. 5 is a diagram showing transition of states of communication between the mobile telephone 20 and the communication device 40 in accordance with an illustrative embodiment. In response to receiving a nonblocking control request, the updating unit 220 updates the communication state stored in the storage unit 24 in accordance with solid lines in FIG. 5 even if the communication device 26 cannot communicate with the proxy server 30. The communication state transition according to a nonblocking control request will be described in detail. First, if a socket has not yet been generated, there exists no state corresponding to the socket. This state is defined as a blank state of the socket for convenience of explanation. In response to a control request to generate a new socket, the updating unit 220 stores a generation state (OPEN state shown in FIG. 5) indicating that the socket has been newly generated in association with identification information of the socket to be generated in the storage unit 24 as a communication state. The identification information may be generated by the updating unit 220 irrespective of identification information of a socket generated by the proxy server 30. Here, this control request may be a socket system call defined in the BSD Socket API. Since this control request is a nonblocking control request, the communication state is updated without waiting for the control processing performed by the proxy server 30.

Next, in response to receiving, in association with the identification information of the socket, a control request to prepare to receive a communication request from the communication device 40, the updating unit 220 updates the communication state corresponding to the identification information to a buffer allocated state (LISTEN state shown in FIG. 5). This control request is a request to cause the proxy server 30 to allocate a buffer for storing a communication request received from the communication device 40 to the socket. For example, this control request may be a listen system call defined in the BSD Socket API. Since this control request is also a nonblocking control request, the communication state is updated without waiting for the control processing. In response to receiving, in association with the identification information of the socket, a control request to free the socket in the OPEN state, the LISTEN state, or a CONNECTED state described later, the updating unit 220 returns the communication state corresponding to the identification information to a blank state. This control request may be a close system call defined in the BSD Socket API. Since this control request is also a nonblocking control request, the communication state is updated without waiting for the control processing.

If the updating unit 220 receives from the task 200 a control request to change an attribute of communication between the communication device 26 and the communication device 40, the updating unit 220 determines that the received control request is a nonblocking control request. For example, in response to receiving, in association with the identification information of the socket, a control request to allocate a specified port number to the socket in the OPEN state, the updating unit 220 stores the port number in the storage unit 24 in association with the identification information of the socket. This control request may be a bind system call defined in the BSD Socket API. Since this control request is also a nonblocking control request, the port number allocation is performed without waiting for the control processing performed by the proxy server 30.

On the other hand, in response to receiving a blocking control request, the updating unit 220 updates the communication state stored in the storage unit 24 on the basis of the result of control processing received by the receiving unit 250 in accordance with a dotted line shown in FIG. 5. The communication state transition depending on a blocking control request will be described in detail. If a control request received from the task 200 is a request to detect whether the communication device 26 and the communication device 40 can communicate with each other, a request to transmit a communication approval in response to a communication request from the communication device 40, or a request to transmit or receive data, the updating unit 220 determines that the received request is a blocking control request. For example, in response to receiving, in association with the identification information of the socket, a control request (for example, a select system call) to detect whether the communication device 26 and the communication device 40 can communicate with each other in the LISTEN state, the updating unit 220 updates a communication state corresponding to the identification information to a communication waiting state (a LISTEN+SELECT state shown in FIG. 5). The select system call issues a request to examine states of a plurality of sockets. With this system call, it can be determined data can be read from each of the sockets, whether data can be written into each of the sockets, or whether an error occurs in the reading or writing. If the receiving unit 250 receives the result of the detection whether the communication device 26 and the communication device 40 can communicate with each other which has been performed by the proxy server 30, the updating unit 220 returns the communication state corresponding to the identification information to the buffer allocated state. Thus, since this control request is a blocking control request, the result of control processing performed by the proxy server 30 is transmitted to the task 200 after completion of the control processing.

In response to receiving, in association with the identification information of the socket, a control request (for example, an accept system call) to transmit a communication approval for to a communication request from the communication device 40, the updating unit 220 updates the communication state corresponding to the identification information to a communication accepting state (ACCEPT state shown in FIG. 5). If the receiving unit 250 receives the result of control processing performed by the proxy server 30, the updating unit 220 returns the communication state corresponding to the identification information to the buffer allocated state. If a socket has been newly generated by this control processing, the updating unit 220 may store the identification information of the new socket in the storage unit 24, and may store a connected state (CONNECTED state shown in FIG. 5) in association with the identification information, In this case, the updating unit 220 transmits the identification information to the proxy server 30 so as to associate the newly generated identification information with the socket generated by the proxy server 30. Since this control request is a blocking control request, the result of control processing performed by the proxy server 30 is transmitted to the task 200 after completion of the control processing.

In response to receiving in the CONNECTED state a control request to transmit or receive data using a socket (for example, select system call, recv system call, or send system call shown in FIG. 5) in association with the identification information of the socket, the updating unit 220 determines that the control request is a blocking control request. Then, the updating unit 220 updates the communication state corresponding to the identification information to a communication waiting state (SELECT, RECV, or SEND state shown in FIG. 5). If the receiving unit 250 receives the result of data transmission or reception performed by the proxy server 30, the updating unit 220 returns the communication state corresponding to the identification information to the connected state. Thus, since this control request is a blocking control request, the result of control processing performed by the proxy server 30 is sent to the task 200 after completion of the control processing.

FIG. 6 shows communication states of the mobile telephone 20 and instructions that are transmitted to the communication device 40 in accordance with the communication states in accordance with an illustrative embodiment. A specific example of processing performed by the control instruction unit 240 will be described with reference to FIG. 6. The control instruction unit 240 transmits to the proxy server 30 an instruction for changing a state of communication with the communication device 40 in the proxy server 30 to a communication state stored in the storage unit 24 when the communication device 26 and the proxy server 30 can communicate with each other. To this end, the control instruction unit 240 first retrieves the communication state of each socket from the central processing unit 22. Then, the control instruction unit 240 transmits an instruction associated with the retrieved communication state to the proxy server 30. FIG. 6 shows the association between the communication states and the instructions in this processing. That is, if the OPEN state is retrieved for a certain socket, the control instruction unit 240 transmits an instruction for executing a socket system call to the proxy server 30. If the communication state for another socket is the LISTEN state, the control instruction unit 240 transmits to the proxy server 30 an instruction for generating a new socket and managing the generated socket in association with the identification information thereof (for example, an instruction for executing a socket system call), and an instruction for allocating a buffer for storing a communication request received from the communication device 40 to the generated socket (for example, an instruction for executing a listen system call). If the SELECT state is retrieved for another socket, the control instruction unit 240 transmits an instruction for executing a socket system call and a select system call in this order to the proxy server 30. If the LISTEN+SELECT state is retrieved for another socket, the control instruction unit 240 transmits an instruction for executing a socket system call, a bind system call, a listen system call, and a select system call in this order to the proxy server 30.

Figure 7:
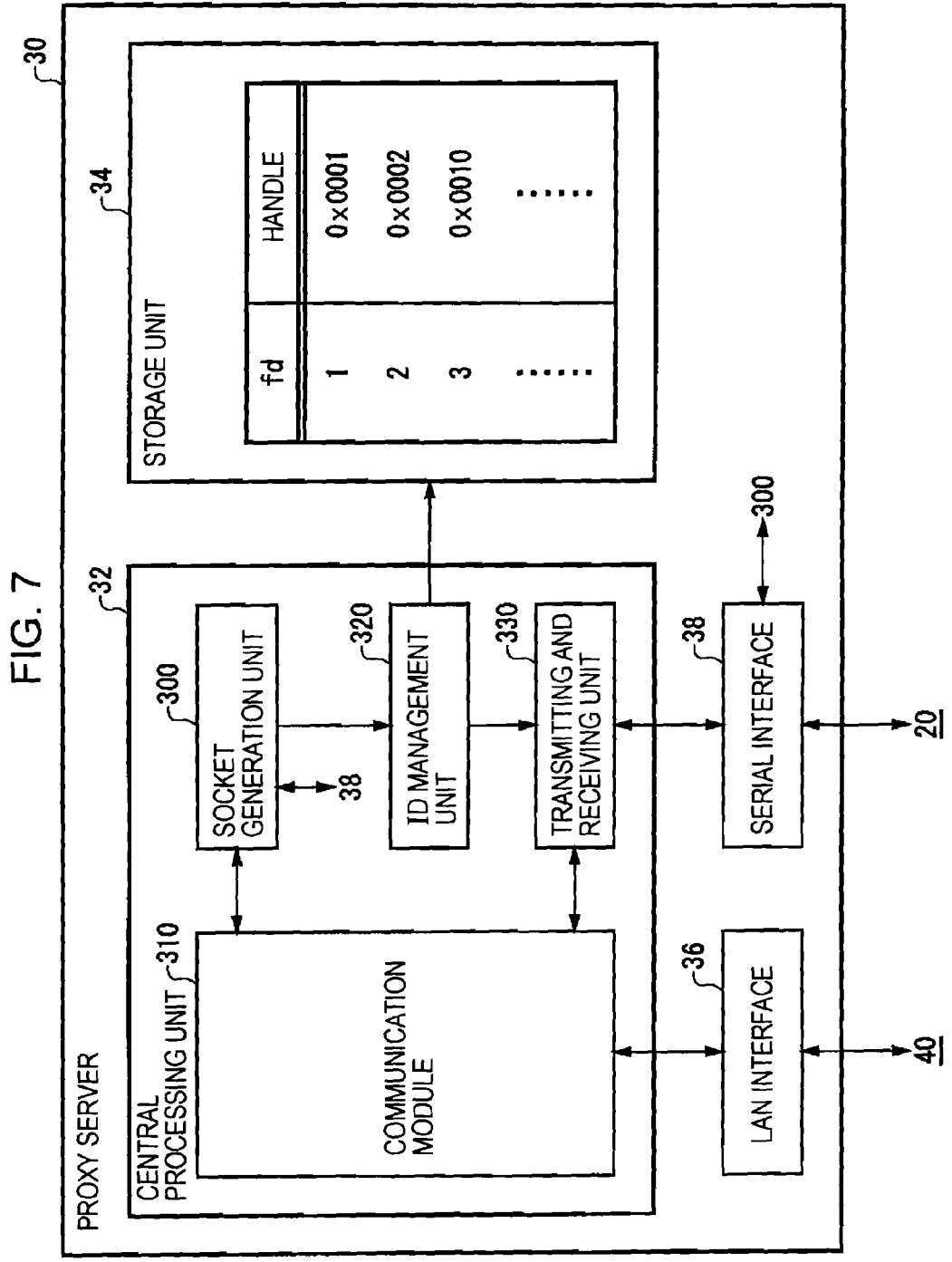
FIG. 7 shows a functional configuration of a proxy server in accordance with an illustrative embodiment.

FIG. 7 shows a functional configuration of the proxy server 30 in accordance with an illustrative embodiment. The proxy server 30 is provided with a central processing unit 32, a storage unit 34, a LAN interface 36, and a serial interface 38. The storage unit 34 stores first identification information (for example, referred to as an fd) of a socket specified by the mobile telephone 20 and second identification information (for example, referred to as a handle) of a socket which the proxy server 30 uses to communicate with the communication device 40, with the first identification information being associated with the second identification information. Although the first identification information may be different from the second identification information, the associated first and second identification information identify the same socket generated by the proxy server 30. That is, a socket generated by the proxy server 30 is identified by the task 200 running on the mobile telephone 20 using the first identification information, and is identified by a communication module 310 running on the proxy server 30 using the second identification information.

The LAN interface 36 communicates with the communication device 40 via the second communication line 35 such as an Ethernet (registered trademark) communication line so that the mobile telephone 20 and the communication device 40 can communicate with each other. On the other hand, the serial interface 38 communicates with the mobile telephone 20 via the first communication line 25 such as a serial line, a parallel line, or a USB (Universal Serial Bus). The serial interface 38 receives a communication control instruction from the mobile telephone 20, or transmits the result of communication control processing to the mobile telephone 20.

The central processing unit 32 functions as a socket generation unit 300, the communication module 310, an ID management unit 320, and a transmitting and receiving unit 330 in accordance with preinstalled programs. The central processing unit 32 functions as the communication module 310 in accordance with, for example, a library program of a Windows (registered trademark) operating system used to perform socket communication. The communication module 310 controls communication between the proxy server 30 and the communication device 40. In response to receiving an instruction for generating a new socket and managing the generated socket in association with the first identification information, the socket generation unit 300 generates a socket used for communication between the proxy server 30 and the communication device 40, and acquires the second identification information. The generation of the socket is achieved by invoking a system call from the communication module 310.

The ID management unit 320 associates the first identification information received by the serial interface 38 with the second identification information acquired by the socket generation unit 300, and stores them in the storage unit 34. In response to receiving from the serial interface 38 an instruction for transmitting or receiving data using a socket in association with the first identification information of the socket, the transmitting and receiving unit 330 retrieves second identification information corresponding to the first identification information from the storage unit 34, and then transmits or receives data to or from the communication device 40 using the socket identified with the retrieved second identification information. The transmission and reception of data between the proxy server 30 and the communication device 40 is achieved by invoking a system call from the communication module 310.

In the present embodiment, the proxy server 30 and the communication device 40 are separately disposed. However, a single information processing system may function as the proxy server 30 and the communication device 40. In this case, the transmitting and receiving unit 330 performs TCP/IP communication with other tasks that operate in the proxy server 30. Thus, the proxy server 30 may control communication between the tasks in the proxy server 30 and the mobile telephone 20.

Figure 8:
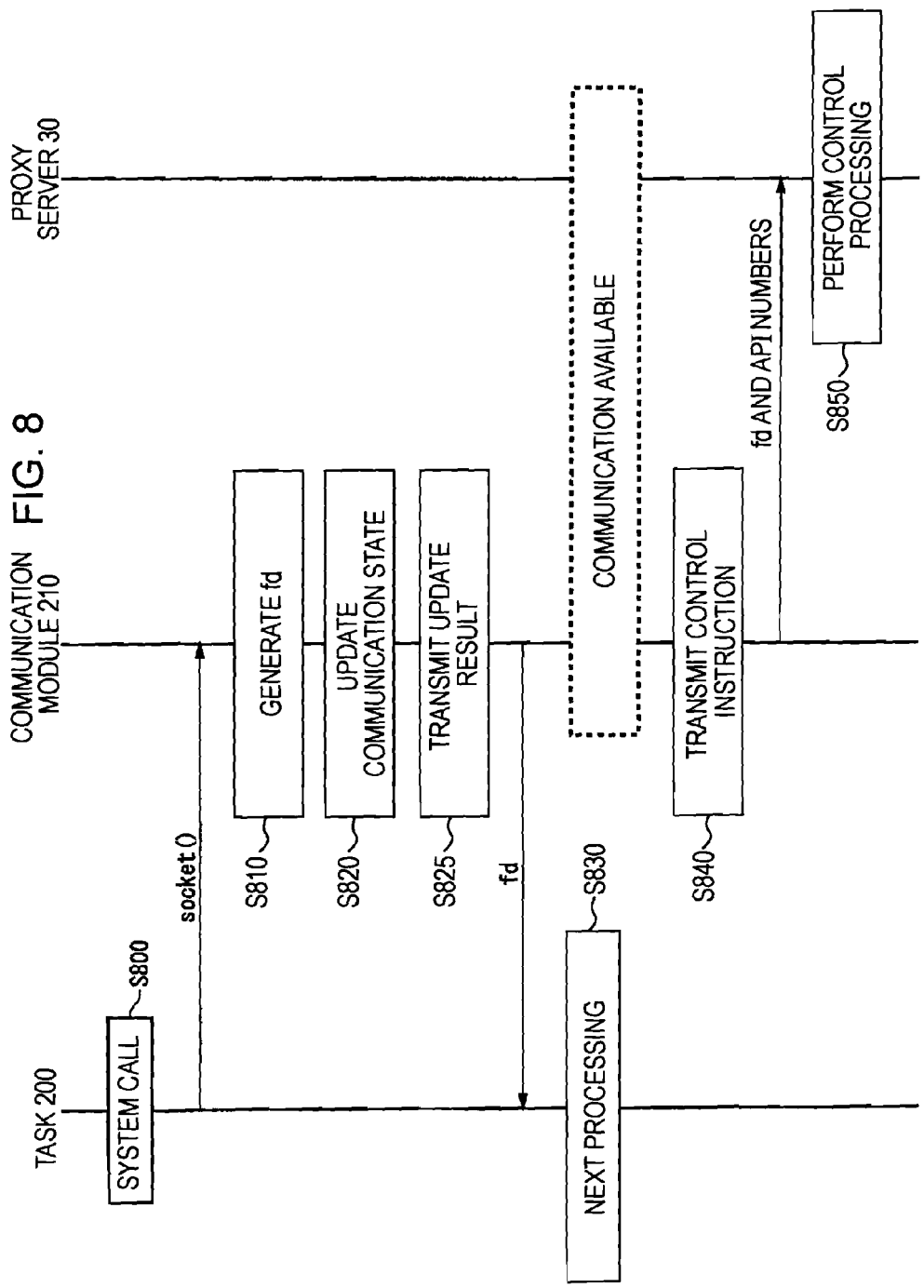
FIG. 8 shows first example processing performed by the mobile telephone and the proxy server in accordance with an illustrative embodiment.

FIG. 8 shows first example processing performed by the mobile telephone 20 and the proxy server 30 in accordance with an illustrative embodiment. The task 200 transmits a control request to generate a new socket to the communication module 210 (S800). This control request may be implemented by invoking a socket system call. Upon receiving this control request, the updating unit 220 generates first identification information (fd) of a socket to be newly generated regardless of whether the communication device 26 and the proxy server 30 can communicate with each other (S810). Next, the updating unit 220 stores a generation state (OPEN state) indicating that a socket has been newly generated as a communication state in the storage unit 24 in association with the generated first identification information (S820). Next, the response unit 230 transmits the first identification information as an update result of the communication state to the task 200 (S825). The BSD Socket API standard prescribes that a value −1 is returned when a socket system call fails while identification information of a socket is returned when a socket system call succeeds. Accordingly, the transmission of or response with the first identification information of the socket means that the updating of the communication state has succeeded. Upon receiving the update result, the task 200 performs the next processing specified by an application program (S830).

If the communication device 26 and the proxy server 30 can communicate with each other, or if the communication device 26 and the proxy server 30 are brought into a communication available state, the following processing is performed. If the communication state stored in the storage unit 24 is the generation state (OPEN state), the control instruction unit 240 transmits to the proxy server 30 an instruction for newly generating a socket and managing the generated socket in association with the first identification information thereof (S840). For example, the control instruction unit 240 may transmit an API number used to identify a socket system call to be executed and first identification information (fd) to be managed in association with a socket generated. In addition, the control instruction unit 240 may transmit to the proxy server 30 an argument specified when a system call is invoked by the task 200. Upon receiving this instruction, the socket generation unit 300 generates a socket used for communication between the proxy server 30 and the communication device 40 and second identification information of the generated socket (S850). The ID management unit 320 associates the received first identification information with the generated second identification information to manage them.

As described above with reference to an example socket system call, if a nonblocking control request is received, the updating unit 220 updates the communication state without waiting until the control processing corresponding to the control request is completed. The response unit 230 transmits the update result of the communication state to the task 200 as a response. Consequently, the task 200 can continue to perform subsequent processing even if the first communication line 25 between the mobile telephone 20 and the proxy server 30 is disconnected. Here, the socket system call is an example of the nonblocking control request. In the case of a listen system call, the same processing as that shown in FIG. 8 is performed. That is, when the communication module 210 receives invocation of a listen system call used to allocate a buffer to a socket, the updating unit 220 updates the communication state to the buffer allocated state (LISTEN state) and the response unit 230 responds to the task 200 that the buffer allocation has succeeded, even if the first communication line 25 between the mobile telephone 20 and the proxy server 30 is disconnected. Thus, by delaying actual control processing performed in response to a resource allocation request until communication is started, the task 200 can continue its processing even if the mobile telephone 20 and the proxy server 30 cannot communicate with each other.

Figure 9:
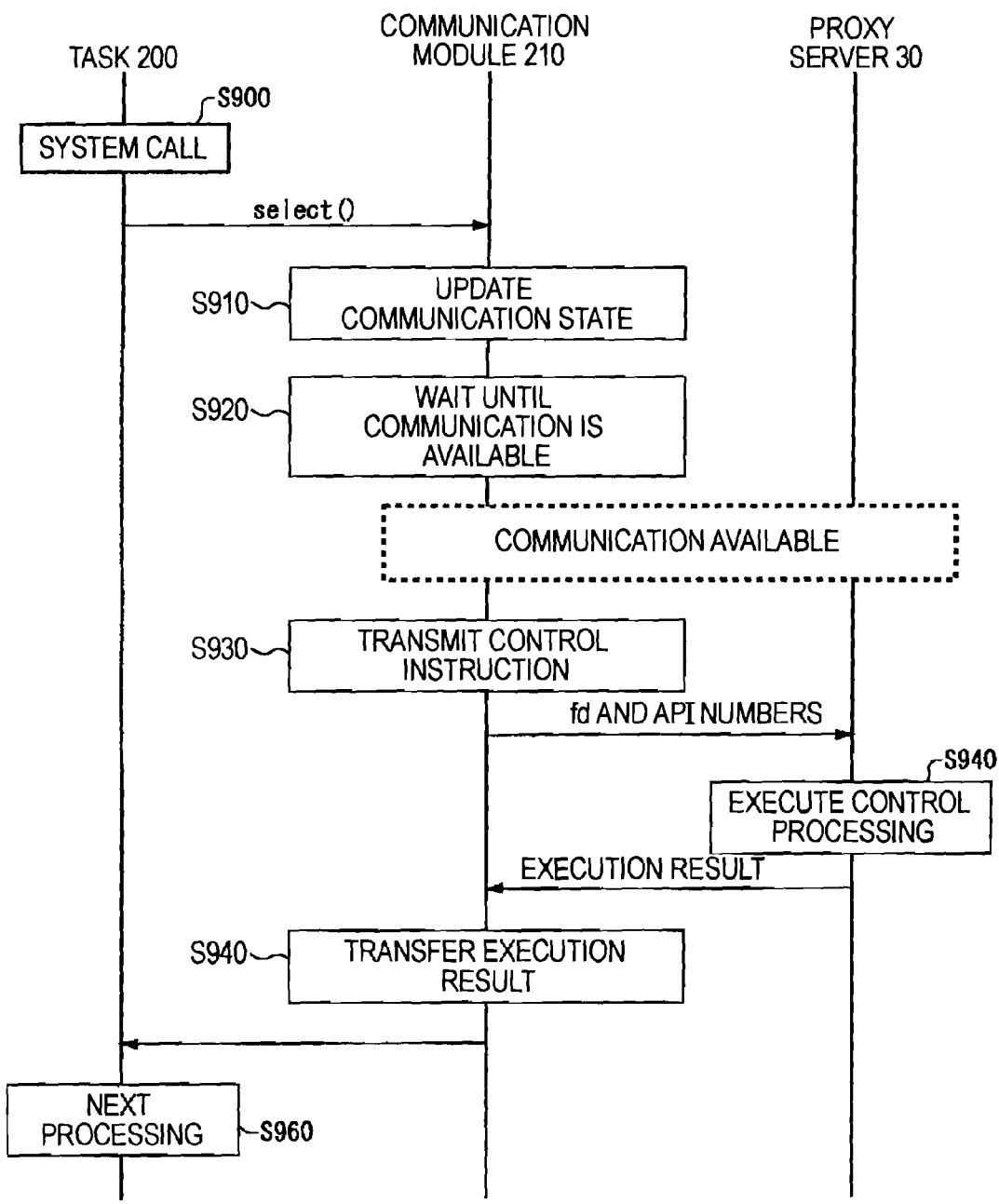
FIG. 9 shows second example processing performed by the mobile telephone and the proxy server in accordance with an illustrative embodiment.

FIG. 9 shows second example processing performed by the mobile telephone 20 and the proxy server 30 in accordance with an illustrative embodiment. The task 200 transmits a control request to detect whether the communication device 26 and the communication device 40 can communicate with each other using a socket in association with the first identification information of the socket (S900). This control request may be implemented by invoking a select system call. Upon receiving this control request, the updating unit 220 updates the communication state of the socket corresponding to the first identification information to a communication waiting state (S910). Then, the updating unit 220 suspends the processing of the task 200 and waits until the communication device 26 and the proxy server 30 can communicate with each other (S920). In this case, the updating unit 220 may associate identification information used to identify the waiting task 200 with the first identification information, and store them in the storage unit 24.

If the communication state is the communication waiting state, the response unit 230 transmits a plurality of following instructions to the proxy server 30 (S930) when the communication device 26 and the proxy server 30 can communication with each other. These instructions include an instruction for generating a new socket and managing the generated socket in association with the first identification information (for example, an instruction for executing a socket system call), an instruction for allocating a buffer for storing a communication request to the socket (for example, an instruction for executing a listen system call), and an instruction for detecting whether communication can be performed using the socket (for example, an instruction for executing a select system call). The response unit 230 may associate API numbers used to identify the respective system calls with the first identification information of the socket to be controlled, and transmit them to the proxy server 30.

Upon receiving these instructions, the socket generation unit 300 controls communication (S940). First, the socket generation unit 300 generates a socket used for communication between the proxy server 30 and the communication device 40 and second identification information of the generated socket (S940). The ID management unit 320 associates the second identification information with the first identification information, and stores them in the storage unit 34. Here, even if the socket generation unit 300 receives the instruction for newly generating a socket and managing the generated socket in association with the first identification information thereof, the socket generation unit 300 may not newly generate a socket when the first identification information has been already stored in the storage unit 34. In this case, the ID management unit 320 and the transmitting and receiving unit 330 perform other processing for a socket identified by the second identification information corresponding to the stored first identification information.

The socket generation unit 300 allocates a buffer for storing a communication request to the socket identified by the second identification information. The transmitting and receiving unit 330 transmits or receives data to or from the communication device 40 using the socket. For example, the transmitting and receiving unit 330 detects whether communication can be performed using the socket by communicating with the communication device 40. When the detection is completed, the result of the detection is transmitted to the communication module 210. If the receiving unit 250 receives the result of the detection from the proxy server 30, the response unit 230 transmits the result of the detection to the task 200 (S950) as a response. The updating unit 220 returns the communication state corresponding to the first identification information to the buffer allocated state. In response thereto, the task 200 continues to perform the next processing (S960).

As described above with reference to FIG. 9, in the case of a blocking control request for which transmission and reception of data are required, for example, the result of control processing corresponding to the control request is transmitted to the task as a response. That is, the task 200 suspends its processing until the transmission and reception of data is completed. Even if the communication module 210 receives only a select system call, the communication module 210 instructs the proxy server 30 to perform not only control processing corresponding to the select system call but also control processing corresponding to a socket system call and a listen system call received in the past. Consequently, consistency between the communication states of the mobile telephone 20 and the proxy server 30 can be maintained.

Figure 10:
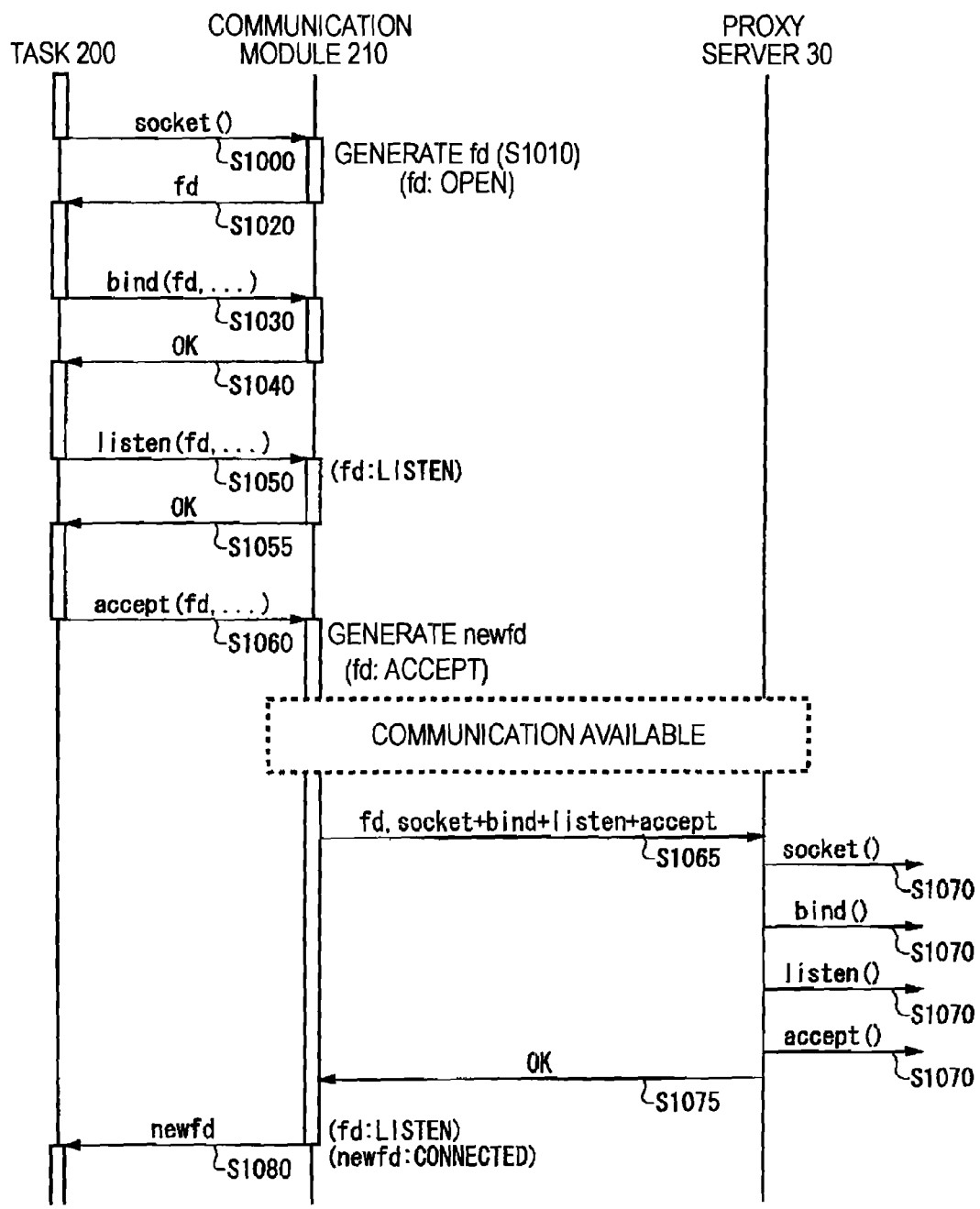
FIG. 10 shows third example processing performed by the mobile telephone and the proxy server in accordance with an illustrative embodiment.

FIG. 10 shows third example processing performed by the mobile telephone 20 and the proxy server 30 in accordance with an illustrative embodiment. A typical example of processing of an application program for performing socket communication will be described with reference to FIG. 10. If the task 200 requests the invocation of a socket system call to the communication module 210 (S1000), the updating unit 220 generates first identification information of a socket (S1010), and the response unit 230 responds to the task 200 with the first identification information (S1020). If the task 200 invokes a bind system call to allocate a specified port number to the socket (S1030), the updating unit 220 associates the port number with the first identification information and stores them in the storage unit 24. Then, the response unit 230 responds to the task 200 that the allocation of the port number has succeeded (S1040).

If the task 200 requests the invocation of a listen system call to the communication module 210 (S1050), the updating unit 220 updates the communication state to the buffer allocated state, and the response unit 230 responds to the task 200 that the buffer allocation has succeeded (S1055). Next, if the task 200 invokes an accept system call to transmit a communication approval in response to a communication request received from the communication device 40 (S1060), the updating unit 220 generates first identification information of a socket to be newly generated and stores it in the storage unit 24. In addition, the updating unit 220 updates the communication state corresponding to the first identification information to the communication accepting state (ACCEPT state), and suspends the processing of the task 200 until the mobile telephone 20 can communicate with the proxy server 30. Thus, the processing of the task 200 continues without being suspended until a blocking control request such as the accept system call is issued.

The control instruction unit 240 transmits a plurality of following instructions to the proxy server 30 when the mobile telephone 20 and the proxy server 30 can communicate with each other (S1065). These instructions include an instruction for newly generating a socket and managing the generated socket in association with the first identification information (for example, an instruction for executing a socket system call), an instruction for allocating a buffer for storing a communication request received from the communication device 40 to the socket (for example, an instruction for executing a listen system call), and an instruction for transmitting a communication approval in response to a communication request received from the communication device 40 (for example, an instruction for executing an accept system call). If the first identification information and the port number have been associated and stored, the control instruction unit 240 may transmit to the proxy server 30 an instruction for allocating the port number in association with the port number.

In addition, the control instruction unit 240 generates first identification information (newfd) to be managed in association with a socket that will be newly generated in accordance with an accept system call. More specifically, the control instruction unit 240 retrieves an entry associated with the blank state in the storage unit 24, and acquires identification information of a socket corresponding to the entry. For example, the entry in the third row of the table illustrated in FIG. 3 is associated with the blank state. This entry is positioned in a row next to a row in which an entry has a numeral 2 as first identification information. Accordingly, the control instruction unit 240 generates a numeral 3, which is the sum of 2 and 1, as first identification information (newfd), and stores it in the storage unit 24. Then, the control instruction unit 240 transmits the newly generated first identification information (newfd) to the proxy server 30 so as to associate the first identification information (newfd) with a socket generated by the proxy server 30.

Upon receiving these instructions, the socket generation unit 300 invokes the socket system call, the bind system call, the listen system call, and the accept system call (S1070). The ID management unit 320 included in the proxy server 30 associates the received first identification information (newfd) with second identification information of a newly generated socket, and stores them in the storage unit 34. The execution results of these system calls are transmitted back to the communication module 210 (S1075). In response thereto, the updating unit 220 returns the communication state corresponding to the first identification information (fd) to the buffer allocated state (LISTEN state), and updates the communication state corresponding to the first identification information (newfd) to the connected state. The response unit 230 responds to the task 200 with the first identification information (newfd) as the results of the control processing (S1080). Consequently, the task 200 can proceed to the next processing by canceling its suspension.

Thus, according to the embodiment, even if the first communication line 25 between the mobile telephone 20 and the proxy server 30 is ineffective, the execution of the task 200 can be continued for control processing which does not require communication with the proxy server 30, for example, acquisition and release of socket resources, on the presumption that the control processing has succeeded. When the communication is actually started, the execution of the task 200 is suspended to perform processing such as the acquisition and release of socket resources. Accordingly, even if there is a possibility that the first communication line 25 is disconnected, the task 200 can continue TCP/IP communication. As a result, a serial interface or a parallel interface can be used for the first communication line 25 instead of Ethernet (registered trademark). In addition, the first communication line 25 can be temporarily disconnected. In order to prevent the operation of the mobile telephone 20 from being affected by this disconnection, the mobile telephone 20 may usually operate without being connected to the proxy server 30, and may be connected to the proxy server 30 only when necessary, for example, when debugging is performed.

Figure 11:
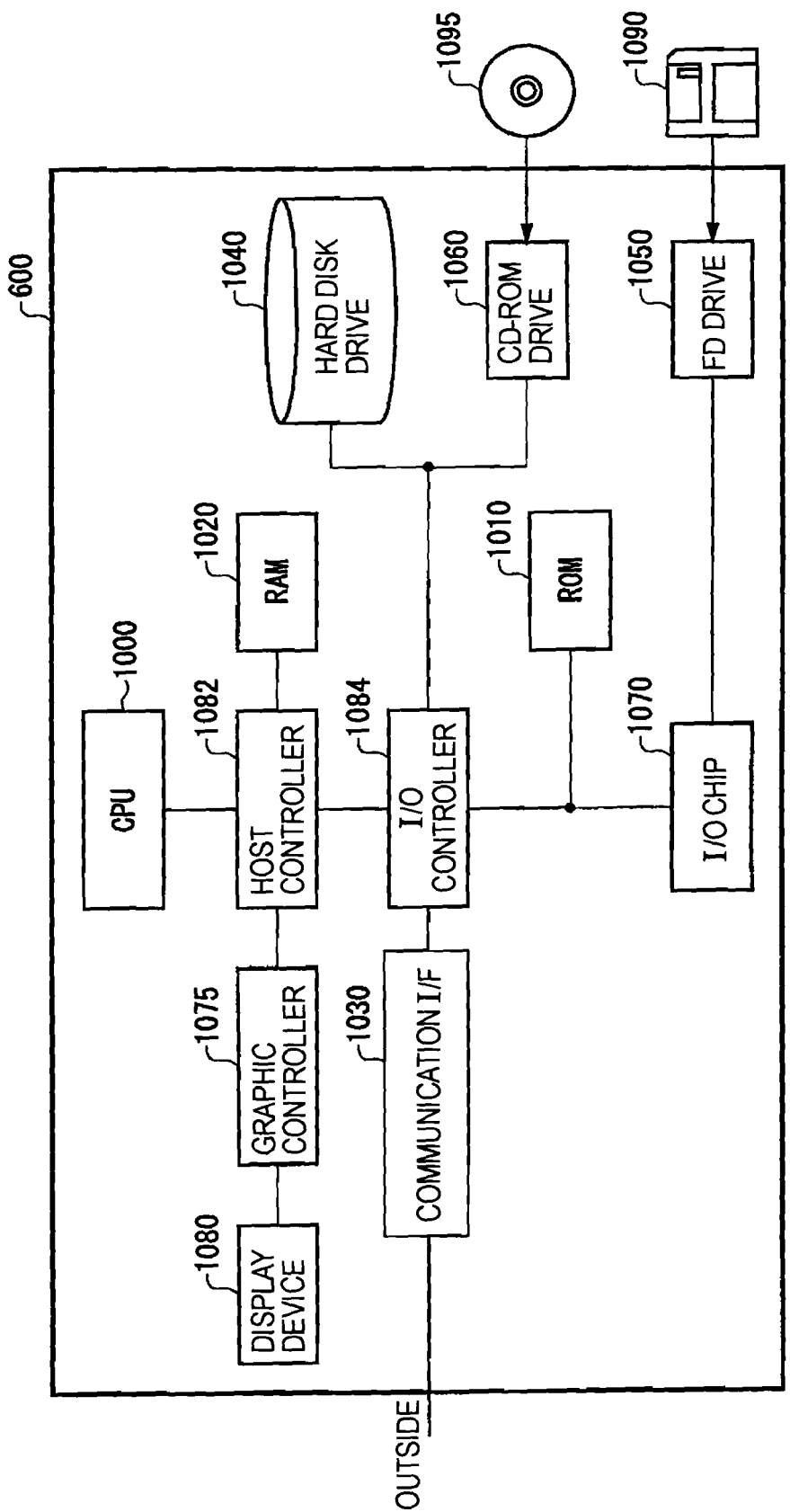
FIG. 11 shows an example hardware configuration of an information processing system that functions as the proxy server in accordance with an illustrative embodiment.

FIG. 11 shows an example hardware configuration of an information processing system 600 that functions as the proxy server 30 in accordance with an illustrative embodiment. The information processing system 600 is provided with a CPU related part, an input and output part, and a legacy input and output part. The CPU related part includes a CPU 1000, a RAM 1020, and a graphic controller 1075, which are interconnected by a host controller 1082. The input and output part includes a communication interface 1030, a hard disk drive 1040, and a CD-ROM drive 1060, which are connected to the host controller 1082 via an input and output controller 1084. The legacy input and output part includes a ROM 1010, a flexible disk drive 1050, and an input and output chip 1070, which are connected to the input and output controller 1084.

The host controller 1082 connects the RAM 1020 to the CPU 1000 and the graphic controller 1075 which access the RAM 1020 with a high transfer rate. The CPU 1000 operates in accordance with programs stored in the ROM 1010 and the RAM 1020, and controls each element. For example, the CPU 1000 functions as the central processing unit 32 described with reference to FIG. 7. The graphic controller 1075 acquires image data generated by the CPU 1000 from a frame buffer disposed in the RAM 1020, and displays the acquired image data on a display device 1080. Alternatively, the graphic controller 1075 may contain a frame buffer for storing image data generated by the CPU 1000.

The input and output controller 1084 connects the host controller 1082 to the communication interface 1030, the hard disk drive 1040, and the CD-ROM drive 1060 which are relatively high-speed input and output devices. The communication interface 1030 communicates with an external device via a network. For example, the communication interface 1030 functions as the LAN interface 36 described with reference to FIG. 7. The hard disk drive 1040 stores programs and data used by the information processing system 600. The CD-ROM drive 1060 reads a program or data from a CD-ROM 1095, and provides the read program or data to the RAM 1020 or the hard disk drive 1040. The RAM 1020 may function as the storage unit 34 described with reference to FIG. 7.

In addition, the ROM 1010, the flexible disk drive 1050, and the input and output chip 1070, which are relatively low-speed input and output devices, are connected to the input and output controller 1084. The input and output chip 1070 may function as, for example, the serial interface 38. The ROM 1010 stores a boot program executed by the CPU 1000 when the information processing system 600 is started up, and other programs that are dependent on the hardware of the information processing system 600. The flexible disk drive 1050 reads a program or data from a flexible disk 1090, and provides the read program or data to the RAM 1020 or the hard disk drive 1040 via the input and output chip 1070. The input and output chip 1070 connects the flexible disk 1090, and various input and output devices via a parallel port, a serial port, a keyboard port, a mouse port, etc.

A program to be provided to the information processing system 600 is stored on the flexible disk 1090, the CD-ROM 1095, or a recording medium such as an IC card, and is then provided by a user. The program is read out from the recording medium via the input and output chip 1070 and/or the input and output controller 1084, installed in the information processing system 600, and then executed. A control program for controlling the mobile telephone 20 may be installed in the mobile telephone 20 via the input and output chip 1070 and executed. Operation which the program causes the information processing system 600 to perform are the same as those performed by the proxy server 30 or the mobile telephone 20 which have been described with reference to FIGS. 1 through 10, and the description thereof will therefore be omitted.

The above-described program may be stored on an external recording medium. The external recording medium may be the flexible disk 1090, the CD-ROM 1095, an optical recording medium such as a DVD, a magneto-optical disk, a tape medium, or a semiconductor memory such as an IC card. Alternatively, a storage device such as a hard disk or RAM disposed in a server system connected to a dedicated communication network or the Internet may be used as a recording medium, and the program may be provided to the information processing system 600 via the network.

While the present invention has been described with reference to the above embodiments, the technical scope of the present invention is not limited to the above-described embodiments. It will be apparent to those skilled in the art that various alterations and modifications may be made without departing from the scope of the appended claims.

The invention claimed is:

1. An embedded device communicating with another device via an external proxy server acting for the embedded device to control communication, the embedded device comprising:

a central processing unit;

a communication device configured to communicate with the external proxy server;

a storage unit storing a state of communication with the other device;

an updating unit updating, in response to a control request for communication with the other device being received from a task being executed by the central processing unit, the state of communication responsive to the communication device being unable to communicate with the external proxy server;

a response unit responding to the task with a result of the updating of the state of communication; and a control instruction unit transmitting, to the external proxy server via the communication device, an instruction for changing a state of communication with the other device in the external proxy server to the state of communication stored in the storage unit responsive to the communication device being able to communicate with the external proxy server.

2. The embedded device according to claim 1, further comprising a receiving unit receiving via the communication device from the external proxy server a result of control processing performed by the proxy server in accordance with the instruction transmitted from the control instruction unit, wherein, responsive to the control request received from the task being a nonblocking control request that allows the task to continue a process without waiting until control processing corresponding to the control request is completed, the updating unit updates the state of communication even if the communication device and the external proxy server cannot communicate with each other, and wherein, responsive to the control request received from the task not being a nonblocking control request, the updating unit updates the state of communication in accordance with the result of control processing received by the receiving unit.

3. The embedded device according to claim 2, wherein, responsive to the control request received from the task being a request to acquire or release a resource required for communication, the updating unit determines that the received control request is the nonblocking control request, and responsive to the control request received from the task being a control request for which transmitting and receiving of data between the embedded device and the other device is required, the updating unit determines that the received control request is not the nonblocking control request.

4. The embedded device according to claim 2, wherein, responsive to the control request received from the task being a request to change an attribute of communication between the communication device and the other device, the updating unit determines that the received control request is the nonblocking control request.

5. The embedded device according to claim 2, wherein, responsive to the control request received from the task being a request to detect whether the communication device and the other device can communicate with each other, the updating unit determines that the received control request is not the nonblocking control request.

6. The embedded device according to claim 2, wherein, responsive to the control request received from the task being a request to respond with a communication approval in response to a communication request transmitted from the other device, the updating unit determines that the received control request is not the nonblocking control request.

7. The embedded device according to claim 2,
wherein the external proxy server acts for the embedded device to control communication with the other device via transmission control protocol/Internet protocol,
wherein the storage unit stores a state of communication for each socket in association with identification information thereof,
wherein, in response to a control request to generate a new socket, the updating unit stores in the storage unit a generation state indicating that a socket has been newly generated as the state of communication in association with identification information of the new socket to be generated,
wherein the response unit returns the identification information of the new socket to the task as an update result, and
wherein, responsive to the state of communication being the generation state, the control instruction unit transmits to the external proxy server an instruction for generating the new socket and managing the generated socket in association with the identification information of the new socket, responsive to the communication device being able to communicate with the external proxy server.

8. The embedded device according to claim 7,
wherein, in response to receiving a control request to allocate to a given socket a buffer for storing a communication request received from the other device in association with identification information of the socket, the updating unit updates the state of communication corresponding to the identification information for the given socket to a buffer allocated state,
wherein the response unit transmits a notification that buffer allocation has succeeded to the task, and,
wherein, responsive to the state of communication state being the buffer allocated state, the control instruction unit transmits to the external proxy server an instruction for generating the given socket and managing the generated given socket in association with the identification information for the given socket and an instruction for allocating a buffer to the given socket, responsive to the communication device being able to communicate with the external proxy server.

9. The embedded device according to claim 7,
wherein, in response to receiving a control request to detect whether the communication device and the other device can communicate with each other using a given socket, the updating unit updates the state of communication corresponding to the identification information for the given socket to a communication waiting state,
wherein, responsive to the communication state being the communication waiting state, the control instruction unit transmits to the external proxy server an instruction for generating the given socket and managing the generated given socket in association with the identification information, an instruction for allocating the buffer to the given socket, and an instruction for detecting whether communication can be performed using the given socket, responsive to the communication device being able to communicate with the external proxy server, and
wherein, responsive to the receiving unit receiving from the external proxy server a result of detecting whether communication can be performed using the given socket, the response unit transmits the received detection result to the task, and the updating unit returns the state of communication corresponding to the identification information for the given socket to the buffer allocation completion state.

10. The embedded device according to claim 7,
wherein, in response to receiving a control request to allocate a specified port number to a given socket in association with identification information of the given socket, the updating unit stores the port number in association with the identification information for the given socket in the storage unit,
wherein the response unit transmits a notification that port number allocation has succeeded to the task, and
wherein, responsive to the identification information of the given socket being stored in association with the port number, the control instruction unit transmits the port number to the external proxy server, responsive to the communication device being able to communicate with the external proxy server.

11. The embedded device according to claim 2,
wherein a library program causing the central processing unit to function as the updating unit, the response unit, the control instruction unit, and the receiving unit is installed in the embedded device instead of a library program for performing socket communication,
wherein the task transmits the control request to the updating unit by calling an application program interface included in the installed library program, and
wherein the updating unit determines that it has received the nonblocking control request on condition that it receives from the task at least one of invocation requests for a socket system call, a bind system call, a listen system call, or a close system call, and determines that it has received a control request that is not the nonblocking control request on condition that it receives from the task at least one of invocation requests for an accept system call, a select system call, a receive system call, or a send system call.

12. A computer program product comprising a computer recordable medium having a control program recorded thereon, the control program for controlling an embedded device which communicates with another device via an external proxy server acting for the embedded device to control communication, wherein the control program, when executed on the embedded device, causes the embedded device to:
communicate with the external proxy server;
store a state of communication with the other device in a storage unit of the embedded device;
update, in response to a control request for communication with the other device being received from a task being executed by a central processing unit of the embedded device, the state of communication responsive to the communication device being unable to communicate with the external proxy server;
respond to the task with a result of the updating of the state of communication; and
transmit, to the external proxy server an instruction for changing a state of communication with the other device in the external proxy server to the state of communication stored in the storage unit, responsive to the communication device being able to communicate with the external proxy server.

13. A method for controlling an embedded device which communicates with another device via an external proxy server acting for the embedded device to control communication, the method comprising:
storing a state of communication with the other device in a storage unit of the embedded device;

updating, in response to a control request for communication with the other device being received from a task being executed by a central processing unit of the embedded device, the state of communication responsive to the embedded device being unable to communicate with the external proxy server;

responding to the task with a result of the updating of the state of communication; and transmitting, to the proxy server, an instruction for changing a state of communication with the other device in the external proxy server to the state of communication stored in the storage unit, responsive to the embedded device being able to communicate with the external proxy server.

14. The method according to claim 13, further comprising:

receiving from the external proxy server a result of control processing performed by the external proxy server in accordance with the instruction transmitted from the control instruction unit;

responsive to the control request received from the task being a nonblocking control request that allows the task to continue a process without waiting until control processing corresponding to the control request is completed, updating the state of communication even if the embedded device and the external proxy server cannot communicate with each other; and responsive to the control request received from the task not being a nonblocking control request, updating the state of communication in accordance with the result of control processing received by the receiving unit.

15. The method according to claim 14, further comprising:

responsive to the control request received from the task being a request to acquire or release a resource required for communication, determining that the received control request is the nonblocking control request; and responsive to the control request received from the task being a control request for which transmitting and receiving of data between the embedded device and the other device is required, determining that the received control request is not the nonblocking control request.

16. The method according to claim 14, further comprising:

responsive to the control request received from the task being a request to change an attribute of communication between the embedded device and the other device, determining that the received control request is the nonblocking control request.

17. The method according to claim 14, further comprising:

responsive to the control request received from the task being a request to detect whether the communication device and the other device can communicate with each other, determining that the received control request is not the nonblocking control request.

18. The method according to claim 14, further comprising:

responsive to the control request received from the task being a request to respond with a communication approval in response to a communication request transmitted from the other device, determining that the received control request is not the nonblocking control request.

19. The method according to claim 14, wherein the external proxy server acts for the embedded device to control communication with the other device via transmission control protocol/Internet protocol and wherein the storage unit stores a state of communication for each socket in association with identification information thereof, the method further comprising:

in response to a control request to generate a new socket, storing in the storage unit a generation state indicating that a socket has been newly generated as the state of communication in association with identification information of the new socket to be generated;

returning the identification information of the new socket to the task as an update result; and responsive to the state of communication being the generation state, transmitting to the external proxy server an instruction for generating the new socket and managing the generated socket in association with the identification information of the new socket, responsive to the embedded device being able to communicate with the external proxy server.

20. The method according to claim 14, wherein a library program causing the central processing unit to function as an updating unit, a response unit, a control instruction unit, and a receiving unit is installed in the embedded device instead of a library program for performing socket communication, wherein the task transmits the control request to the updating unit by calling an application program interface included in the installed library program, and wherein the updating unit determines that it has received the nonblocking control request on condition that it receives from the task at least one of invocation requests for a socket system call, a bind system call, a listen system call, or a close system call, and determines that it has received a control request that is not the nonblocking control request on condition that it receives from the task at least one of invocation requests for an accept system call, a select system call, a receive system call, or a send system call.

* * * * *